US011948533B2

(12) United States Patent
Choi et al.

(10) Patent No.: US 11,948,533 B2
(45) Date of Patent: Apr. 2, 2024

(54) DISPLAY SYSTEM INCLUDING PLURALITY OF DISPLAYS AND IMAGE OUTPUT METHOD THEREOF

(71) Applicant: Samsung Electronics Co., Ltd., Suwon-si (KR)

(72) Inventors: Wonseob Choi, Suwon-si (KR); Joohong Lee, Suwon-si (KR); Sangwon Chae, Suwon-si (KR); Chanmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/665,371

(22) Filed: Feb. 4, 2022

(65) Prior Publication Data

US 2022/0254320 A1      Aug. 11, 2022

Related U.S. Application Data

(63) Continuation of application No. PCT/KR2022/000456, filed on Jan. 11, 2022.

(30) Foreign Application Priority Data

Feb. 5, 2021    (KR) .................. 10-2021-0017062

(51) Int. Cl.
*G09G 5/12*         (2006.01)
(52) U.S. Cl.
CPC .......... *G09G 5/12* (2013.01); *G09G 2360/04* (2013.01); *G09G 2360/12* (2013.01)

(58) Field of Classification Search
CPC ... G09G 5/12; G09G 2360/04; G09G 2360/12
See application file for complete search history.

(56) References Cited

U.S. PATENT DOCUMENTS

| 8,738,826 B2 | 5/2014 | Stahl et al. |
| 8,866,698 B2 | 10/2014 | Ortega et al. |
| 9,207,903 B2 | 12/2015 | Stahl et al. |

(Continued)

FOREIGN PATENT DOCUMENTS

| KR | 10-2013-0123757 A | 11/2013 |
| KR | 10-2015-0126976 A | 11/2015 |

(Continued)

OTHER PUBLICATIONS

International Search Report dated Apr. 27, 2022, in connection with International Application No. PCT/KR2022/000456, 3 pages.

*Primary Examiner* — Robert J Michaud

(57) ABSTRACT

A display system according to an embodiment disclosed in the disclosure includes a sink device including a plurality of displays, the plurality of displays including a display having a high refresh rate compared to at least one other display having a low refresh rate among the plurality of displays and a source device operably coupled to the plurality of displays, and the source device renders the image data based on the display having the high refresh rate among the plurality of displays, and transmits at least a portion of the rendered image data to the plurality of displays in synchronization with respective refresh rates of the at least one other display. Additional various embodiments identified through the specification are possible.

20 Claims, 10 Drawing Sheets

(56) References Cited

U.S. PATENT DOCUMENTS

| | | |
|---|---|---|
| 9,552,187 B2 | 1/2017 | Stahl et al. |
| 10,009,628 B2 | 6/2018 | Bushell et al. |
| 10,031,712 B2 | 7/2018 | Stahl et al. |
| 10,388,255 B2 | 8/2019 | Thakur et al. |
| 10,616,480 B2 | 4/2020 | Wu et al. |
| 10,650,761 B2 | 5/2020 | Lee |
| 11,308,919 B2 | 4/2022 | Morris et al. |
| 2010/0156913 A1 | 6/2010 | Ortega et al. |
| 2014/0078390 A1 | 3/2014 | Herrick et al. |
| 2014/0307168 A1* | 10/2014 | Law .................. G09G 5/12 348/500 |
| 2014/0362918 A1* | 12/2014 | Bushell .............. H04N 19/146 375/240.15 |
| 2015/0002372 A1* | 1/2015 | Ortega ............... G06F 3/1423 345/1.3 |
| 2017/0131963 A1 | 5/2017 | Stahl et al. |
| 2018/0359413 A1 | 12/2018 | Wu et al. |
| 2019/0043448 A1 | 2/2019 | Thakur et al. |
| 2019/0122623 A1 | 4/2019 | Lee |
| 2019/0371271 A1 | 12/2019 | Morris et al. |
| 2020/0236276 A1 | 7/2020 | Wu et al. |
| 2021/0233495 A1 | 7/2021 | Morris et al. |
| 2021/0256934 A1 | 8/2021 | Thakur et al. |

FOREIGN PATENT DOCUMENTS

| | | |
|---|---|---|
| KR | 10-2016-0007564 A | 1/2016 |
| KR | 10-2019-0043670 A | 4/2019 |

\* cited by examiner

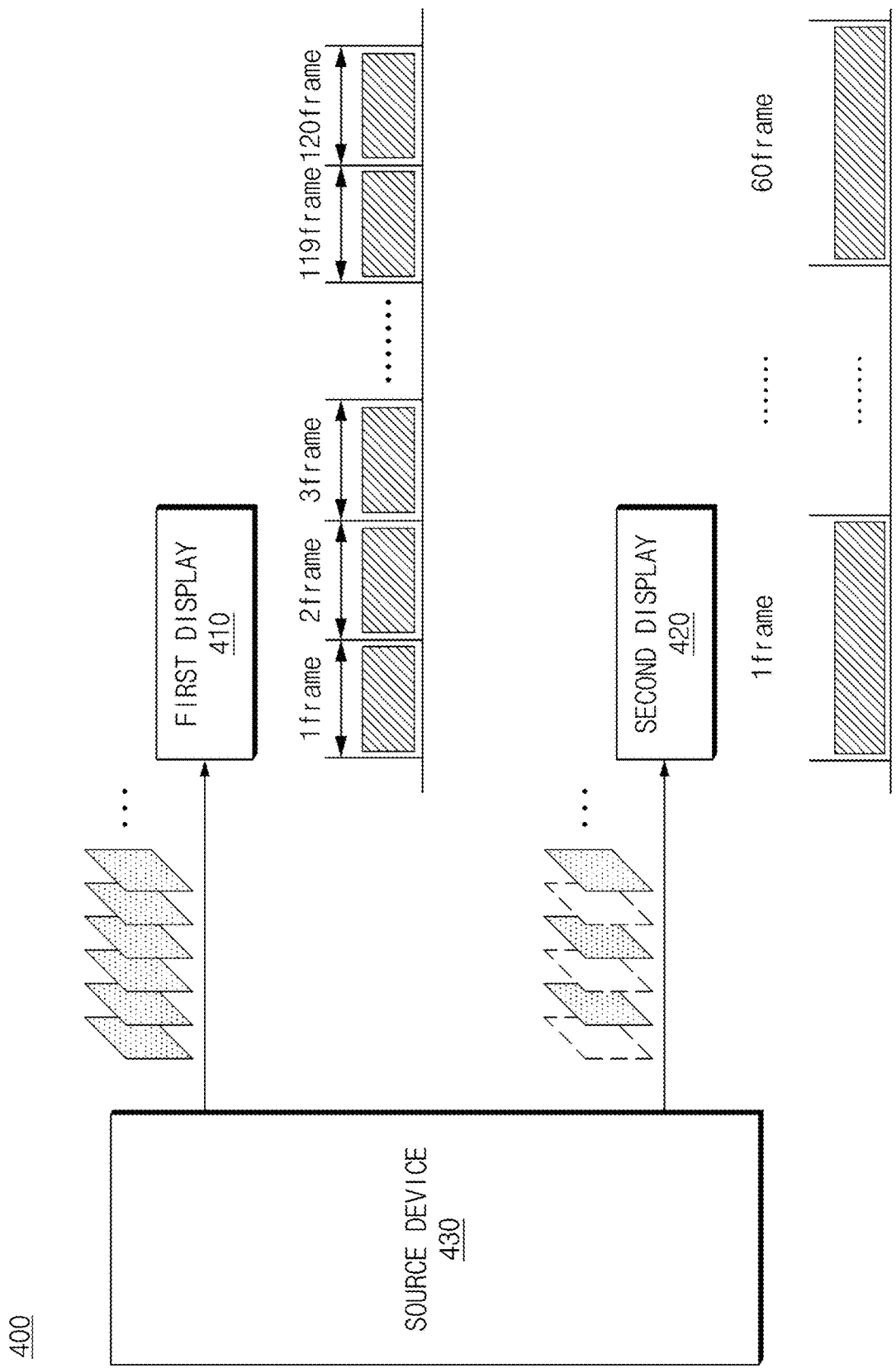

DISPLAY SYSTEM INCLUDING PLURALITY OF DISPLAYS AND IMAGE OUTPUT METHOD THEREOF

CROSS-REFERENCE TO RELATED APPLICATIONS

This application is a continuation of International Application No. PCT/KR2022/000456 filed on Jan. 11, 2022, which claims priority to Korean Patent Application No. 10-2021-0017062 filed on Feb. 5, 2021, in the Korean Intellectual Property Office, the disclosures of which are herein incorporated by reference in their entirety.

BACKGROUND

1. Field

The disclosure relates to a display system and an image output method thereof.

2. Description of Related Art

With the recent technological development of electronic devices, the electronic devices may provide various functions. Since the electronic device (e.g., a source device) may communicate with other electronic devices (e.g., a sink device), the electronic device may operate in association with other electronic devices (e.g., the sink device). For example, one or more contents generated by the electronic device (e.g., the source device) may be output through a plurality of displays (e.g., the sink device).

Any one of the plurality of displays connected to the electronic device, which is the source device, may have different specifications from the other displays. When contents are output on the basis of a display having a low specification among the plurality of displays, the quality of a content displayed on a display having a high specification is deteriorated, thereby causing a performance issue for users.

SUMMARY

Embodiments disclosed in the disclosure are to provide a display system capable of displaying an image in synchronization with each refresh rate of a plurality of displays connected to an electronic device serving as a source device, and an image output method thereof.

According to an embodiment disclosed in the disclosure, a display system includes a sink device including a plurality of displays, the plurality of displays including a display having a high refresh rate compared to at least one other display having a low refresh rate among the plurality of displays and a source device operably coupled to the plurality of displays, and the source device renders the image data based on the display having the high refresh rate among the plurality of displays, and transmits at least a portion of the rendered image data to the plurality of displays in synchronization with respective refresh rates of the at least one other display.

According to an embodiment disclosed in the disclosure, a method of outputting an image of a display system includes identifying a refresh rate of each of a plurality of displays, the plurality of displays including a display having a high refresh rate compared to at least one other display among the plurality of displays having a low refresh rate, rendering image data to be transmitted to the plurality of displays based on the display having the high refresh rate among the plurality of displays, and transmitting at least a portion of the rendered image data to the plurality of displays in synchronization with respective refresh rates of the at least one other display having a low refresh rate.

According to embodiments disclosed in the disclosure, when one or a plurality of contents generated by an electronic device are output through a plurality of displays having different refresh rates, an image may be displayed in synchronization with the respective refresh rates of the plurality of displays. Accordingly, since an image corresponding to specifications of each of the plurality of displays may be displayed, a deterioration of an image quality may be prevented.

In addition, various effects directly or indirectly identified through the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4B is a diagram illustrating frames displayed on the first and second displays according to an embodiment.

In connection with the description of the drawings, the same or similar reference numerals may be used for the same or similar components.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. However, this is not intended to limit the disclosure to specific embodiments, and it should be understood that various modifications, equivalents, and/or alternatives of the embodiments of the disclosure are included.

Figure 1:
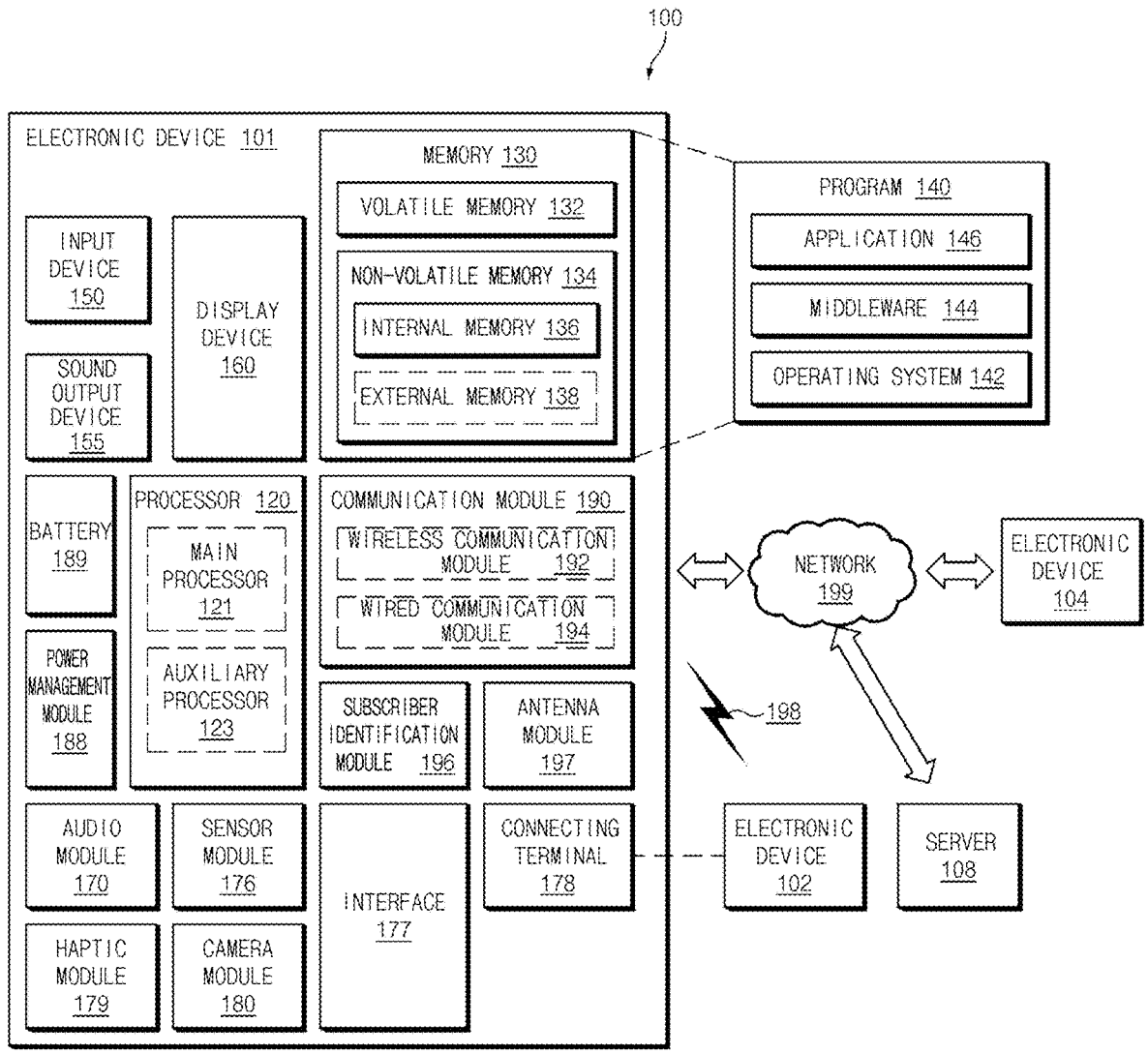
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be integrated into one component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from a different component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be configured to use less power than the main processor 121 or to be specialized for a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application), for example. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specialized for processing an artificial intelligence model. The artificial intelligence model may be generated through machine learning. Such learning may be performed, for example, in the electronic device 101 itself on which artificial intelligence is performed, or may be performed through a separate server (e.g., the server 108). The learning algorithm may include, for example, supervised learning, unsupervised learning, semi-supervised learning, or reinforcement learning, but is not limited to the above-mentioned examples. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more of the above networks, but is not limited to the above examples. The artificial intelligence model may additionally or alternatively include a software structure, in addition to the hardware structure.

The memory 130 may store various data to be used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by a component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or may output the sound via the sound output module 155 or an external electronic device (e.g., the electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell that is not rechargeable, a secondary cell that is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be integrated into a single component (e.g., a single chip), or may be implemented as multi-components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196. The wireless communication module 192 may support a 5G network after a 4G network and a next-generation communication technology, for example, a new radio access technology (NR). NR access technology may support a high-speed transmission of high-capacity data (enhanced mobile broadband (eMBB)), minimization of terminal power and access to multiple terminals (massive machine type communications (mMTC)), or high reliability and low latency (ultra-reliable and low-latency communications (URLLC)). The wireless communication module 192 may support a high frequency band (e.g., mmWave band) to achieve a high data rate, for example. The wireless communication module 192 may support various techniques for securing performance in a high frequency band, for example, beamforming, massive multiple-input and multiple-output (MIMO), full dimensional MIMO (FD-MIMO), array antenna, analog beamforming, or large scale antenna. The wireless communication module 192 may support various requirements defined in the electronic device 101, an external electronic device (e.g., the electronic device 104), or a network system (e.g., the second network 199). According to an embodiment, the wireless communication module 192 may support a peak data rate (e.g., 20 Gbps or more) for achieving the eMBB, loss coverage (e.g., 164 dB or less) for achieving the mMTC, or U-plane latency (e.g., 0.5 ms or less each for downlink (DL) and uplink (UL), or 1 ms or less for the round trip) for achieving the URLLC.

The antenna module 197 may transmit or receive a signal or power to or from the outside (e.g., an external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., an antenna array). In such a case, at least one antenna appropriate for a communication scheme used in the communication network, such as the first network 198 or the second network 199, may be selected from among the plurality of antennas, for example, by the communication module 190. The signal or the power may then be transmitted or received between the communication module 190 and the external electronic device via the selected at least one antenna. According to some embodiments, another component (e.g., a radio frequency integrated circuit (RFIC)) other than the radiating element may be additionally formed as a part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, a cloud computing, distributed computing, mobile edge computing (MEC), or client-server computing technology may be used, for example. The electronic device 101 may provide an ultra-low latency service using, for example, distributed computing or mobile edge computing. In another embodiment, the external electronic device 104 may include an Internet of things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., smart home, smart city, smart car, or health care) based on 5G communication technology and IoT-related technology.

Figure 2:
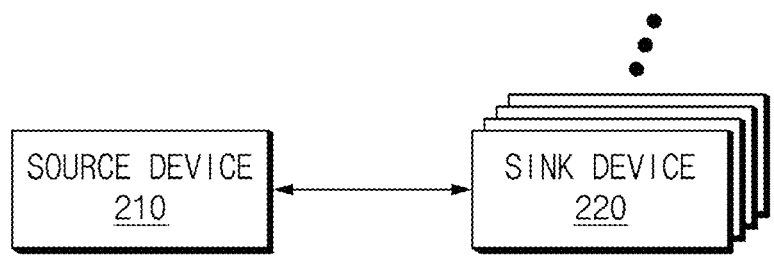
FIG. 2 is a block diagram illustrating a display system according to an embodiment.

According to an embodiment, the electronic devices 101, 102, and 104 illustrated in FIG. 1 may be applied to a display system 200 illustrated in FIG. 2.

FIG. 2 is a diagram describing the display system 200 according to an embodiment.

Referring to FIG. 2, the display system 200 according to an embodiment may include a source device 210 and a plurality of sink devices 220. The display system 200 may output an image generated by the source device 210 to the plurality of sink devices 220 in response to a user command.

The source device 210 may transmit image information generated or stored in the source device 210 to the sink device 220. The source device 210 may be a control unit (e.g., the processor 120 of FIG. 1) of various electronic devices. For example, the source device 210 may be a processor of a smart phone.

The sink device 220 may receive image information transmitted from the source device 210. The sink devices 220 may be a plurality of displays capable of displaying image information received from the source device 210. For example, the sink device 220 may be a display embedded in an electronic device, such as a computer, a notebook computer, a tablet, a digital camera, a camcorder, a PDA, a smart phone, or a TV, or a display connected to the electronic device by wire or wirelessly. The plurality of sink devices 220 may output the image information transmitted from the source device 210 to display the same image or different images. According to an embodiment, the plurality of sink devices 220 include a plurality of displays, and at least one display may have different specifications from the other displays. For example, the plurality of sink devices 220 may be a plurality of displays having different refresh rates. In this case, the refresh rate may be defined as each of a frame frequency, a vertical synchronization signal, and a frame rate for image display. The vertical synchronization signal is a signal that determines a period of one frame of the display. That is, the period of a pulse of the vertical synchronization signal may be set to be one frame period.

Figure 3:
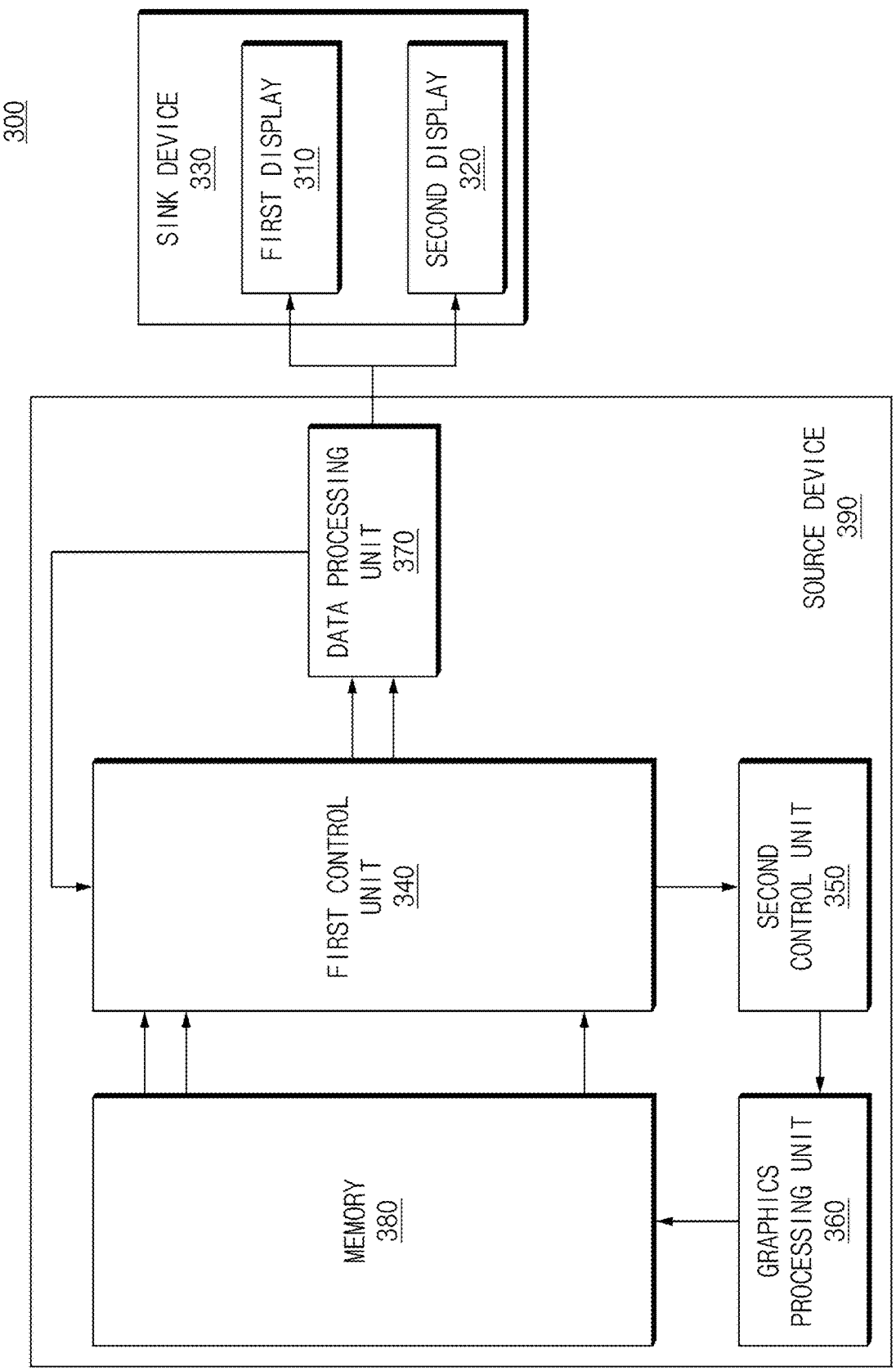
FIG. 3 is a block diagram illustrating a display system in detail, according to an embodiment.

FIG. 3 is a block diagram illustrating a display system 300 according to various embodiments.

Referring to FIG. 3, a sink device 330 may receive image data output from a source device 390 and may display an image corresponding to its refresh rate. The sink device 330 may include two or more displays having different refresh rates. For example, the sink device 330 may include first and second displays 310 and 320. The first display 310 may display an image at a higher refresh rate (or a frame frequency) than the second display 320. The first display 310 may be driven at a refresh rate 'N' (where 'N' is a positive integer greater than 1) times higher than that of the second display 320. For example, any one of the first and second displays 310 and 320 may display an image with a frame frequency of 120 Hz, and the other one of the first and second displays 310 and 320 may display an image with a frame frequency of 60 Hz. have. Hereinafter, a case in which the first display 310 is a display having a high refresh rate and the second display 320 is a display having a low refresh rate will be described as an example. However, this is only one embodiment and the disclosure is not limited to the embodiment.

The source device 390 may include first and second control units 340 and 350, a data processing unit 370, a graphics processing unit 360, and a memory 380.

The data processing unit 370 may identify the number of displays 310 and 320 connected to the source device 390 by at least one of a wired connection and a wireless connection. The data processing unit 370 may obtain identification information such as configuration information and supportable functions of each display 310 or 320 connected to the source device 390 and may transfer it to the first control unit 340. For example, the data processing unit 370 may obtain information on the refresh rate of each display 310 or 320 and may transfer it to the first control unit 340.

The first control unit 340 may identify the display having the high refresh rate, based on the screen refresh rate information of each display 310 or 320 transmitted from the data processing unit 370 and may transfer it to the second control unit 350.

The second control unit 350 may control the graphics processing unit 360 such that the graphics processing unit may render image data based on the high refresh rate obtained from the first control unit 340.

The graphics processing unit 360 may generate rendered graphic data by performing a rendering operation based on a high frequency vertical synchronization signal under a control of the second control unit 350, and may transmit the rendered graphic data to the memory 380.

The memory 380 may include a number of buffers that may be accessed by the first control unit 340. The graphic data rendered by the graphics processing unit 360 may be drawn in the memory 380. In this case, the drawing may be an operation in which the graphic data are transferred to the buffer in the memory 380, and the graphic data may be an image displayed on the sink device 330.

The first control unit 340 may generate image data by synthesizing the rendered graphic data in units of frames. The first control unit 340 may control the data processing unit 370 such that the image data synthesized in units of frames may be output corresponding to the refresh rates of the first and second displays 310 and 320.

The first control unit 340 may determine a drop ratio of a frame to be transmitted to a display having a low refresh rate based on a high refresh rate among the refresh rate information of a plurality of displays transferred from the data processing unit 370. The first control unit 340 may generate an output drop signal depending on the determined frame drop ratio and may apply it to the data processing unit 370.

The first control unit 340 may control positions of a normal frame and a drop frame based on a refresh rate-frame drop ratio. The normal frame may mean a frame in which image data is transmitted to the first and second displays 310 and 320, and the drop frame may mean a frame in which image data transmission to the second display 320 is stopped.

According to an embodiment, the first control unit 340 may process and obtain a ratio and position of the drop frame depending on a difference in the refresh rates of the first and second displays 310 and 320 in real time. The ratio of the drop frame may vary depending on the ratio of the refresh rates of the first and second displays 310 and 320. In this case, as the ratio of the refresh rates of the first and second displays 310 and 320 increases, the number (ratio) of drop frames may increase (higher), and as the difference between the refresh rates of the first and second displays 310 and 320 decreases, the number (ratio) of drop frames may decrease (lower).

According to an embodiment, the first control unit 340 may store the refresh rate-drop frame ratio in advance in the form of a lookup table. Accordingly, the first control unit 340 may map the refresh rates of the first and second displays 310 and 320 to the lookup table to determine frame drop ratio and positions suitable for the first and second displays 310 and 320. In a conversion table of the refresh rate-drop frame ratio, as the refresh rate ratio of the first and second displays 310 and 320 increases, the number (ratio) of drop frames may increase (higher), and as the difference between the refresh rates of the first and second displays 310 and 320 decreases, the number (ratio) of the drop frames may decrease (lower).

The first control unit 340 may control the output of the data processing unit 370 such that a drop frame is not disposed between normal frames to be displayed on the first display 310. The first control unit 340 may control the output of the data processing unit 370 such that at least one or more drop frames are disposed between a plurality of normal frames to be displayed on the second display 320.

In the normal frame, transmission of image data to the first and second displays 310 and 320 may be activated. In the drop frame, in response to the output drop signal, transmission of image data to the second display 320 may be deactivated and transmission of image data to the first display 310 may be selectively activated. Accordingly, in the drop frames, the image data of the previous normal frame is maintained on the second display 320, and in the normal frames, the images displayed on the first and second displays 310 and 320 may be updated. An image displayed on the first display 310 may be displayed the same as the image displayed on the second display 320.

The image data output from the data processing unit 370 may be transmitted to the first and second displays 310 and 320. The first and second displays 310 and 320 may receive the image data of the data processing unit 370 and may display the received image data on the screen. The first display 310 may display the image data on the screen in synchronization with a horizontal synchronization signal and the high frequency vertical synchronization signal. The second display 320 may display the image data on the screen in synchronization with the horizontal synchronization signal and a low frequency vertical synchronization signal.

The number of normal frames equal to the number of image frames input to the data processing unit 370 may be transmitted to the first display 310. A smaller number of normal frames than the number of image frames input to the data processing unit 370 may be transmitted to the second display 320.

After the image data corresponding to the normal frame are transmitted to the first and second displays 310 and 320 through the data processing unit 370, the memory 380 may be freed to a storable state. Also, after the image data corresponding to the normal frame are transmitted to the first display 310 without transmitting the image data corresponding to the drop frame to the second display 320 through the data processing unit 370, the memory 380 may be freed in a state where new data may be stored. After the memory 380 is freed, graphic data of a subsequent frame rendered by the graphics processing unit 360 may be stored. In this case, the freeing may mean initializing the memory 380 in a state in which information stored in the memory 380 is deleted and new data may be stored.

As such, the normal frame output from the source device 390 may be output to the plurality of displays 310 and 320 having different refresh rates. Due to the difference in the refresh rates of the plurality of displays 310 and 320, it may be difficult to properly output without degrading the image quality of at least one of the plurality of displays 310 and 320. Accordingly, according to an embodiment, by adjusting the number of frames transmitted to a low refresh rate display based on a high refresh rate display among the plurality of displays, the images displayed on the plurality of displays 310 and 320 may be synchronized. The same number of normal frames as the number of image frames generated by the first control unit 340 may be transmitted through the data processing unit 370 to the display having the high refresh rate. A smaller number of normal frames than the number of image frames generated by the first control unit 340 may be transmitted through the data processing unit 370 to the display having the low refresh rate.

Figure 4A:
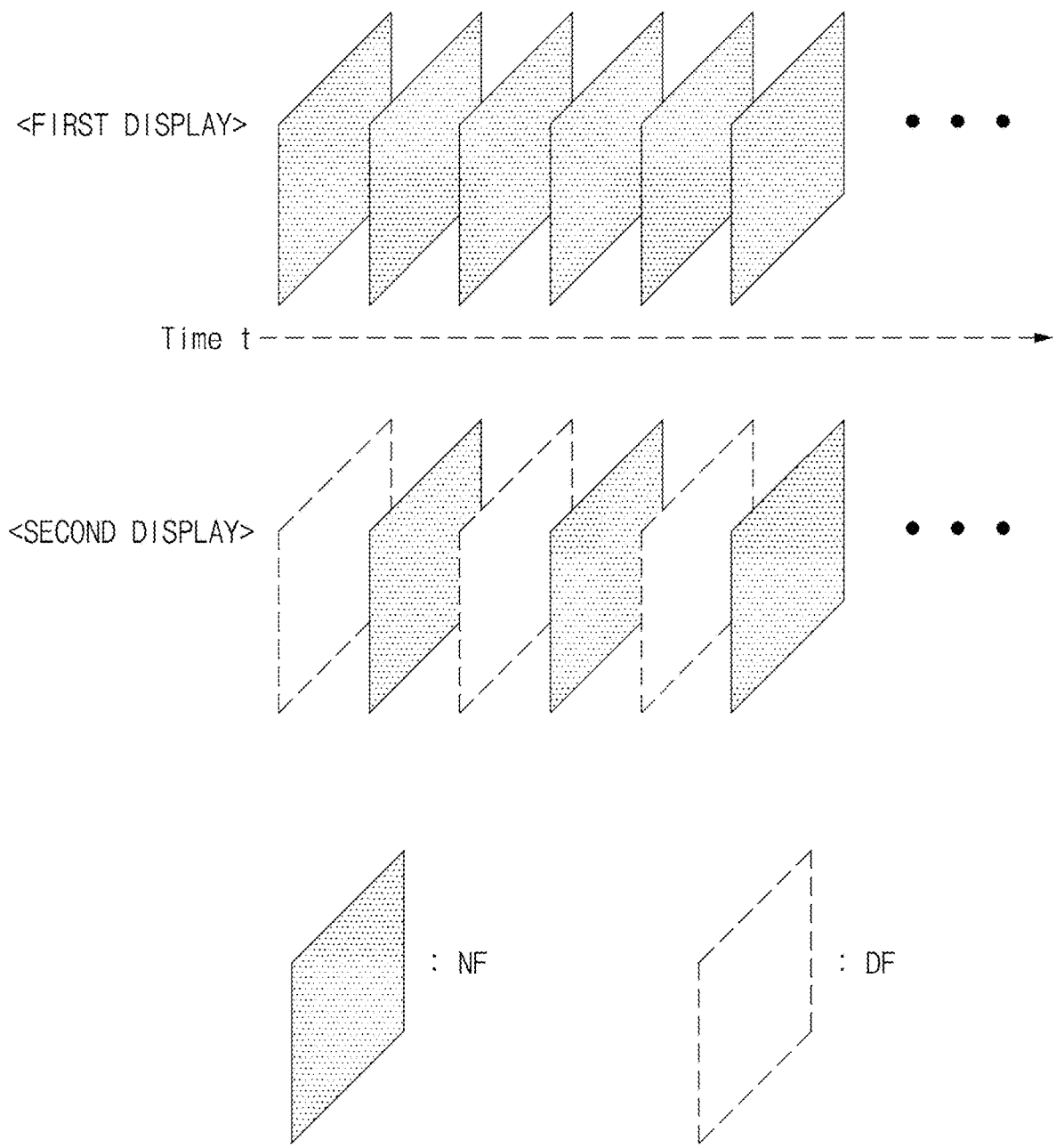
FIG. 4A is a diagram illustrating frames transmitted to first and second displays according to an embodiment.

FIG. 4A is a diagram illustrating frames transmitted to first and second displays according to an embodiment, and FIG. 4B is a diagram illustrating frames displayed in first and second displays according to an embodiment.

Referring to FIGS. 4A and 4B, first and second displays 410 and 420 included in an electronic device 400 may display images at different refresh rates. The first display 410 may be driven by the high frequency vertical synchronization signal and the second display 420 may be driven by the low frequency vertical synchronization signal. For example, the first display 410 may display an image with a frame frequency of 120 Hz, and the second display 420 may display an image with a frame frequency of 60 Hz.

The image data of a normal frame NF may be input to the first display 410 through a source device 430. The first display 410 may display an image during the normal frame using the image data transmitted from the source device 430. In this case, the first display 410 may display T (where, T is a natural number greater than 1) frames for 1 second. For example, the first display 410 may display 120 frames for 1 second.

The image data of the normal frame NF except for a drop frame DF may be transmitted to the second display 420 through the source device 430. The second display 420 may display an image during the normal frame NF using the image data transmitted from the source device 430 and may display the image using the image data of a previous normal frame NF during the drop frame. Accordingly, the second display 420 may display T frames less than T (where, T is a natural number equal to or greater than 1) for 1 second. For example, the second display 420 may display 60 frames for 1 second.

Figure 5:
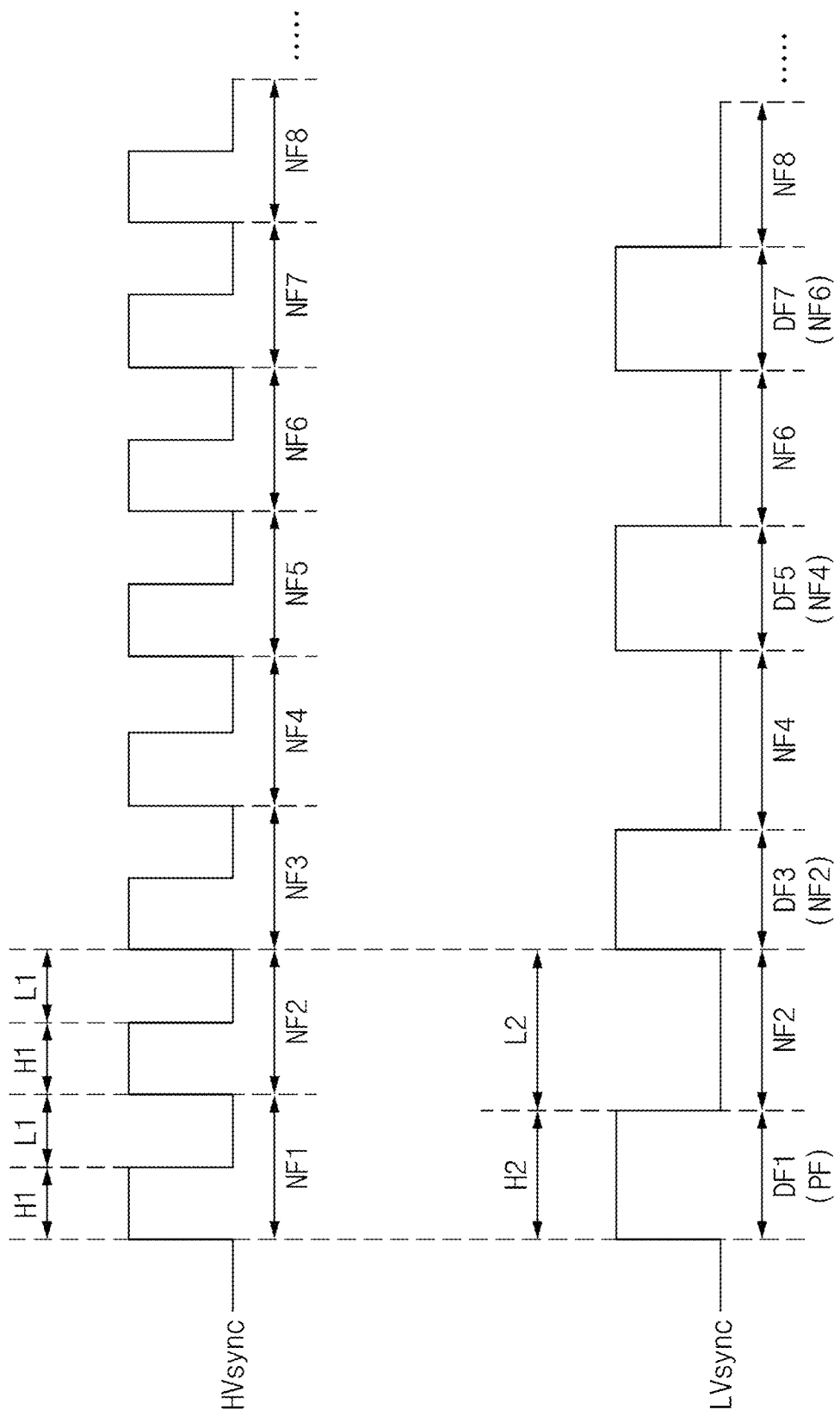
FIG. 5 is a diagram illustrating vertical synchronization signals of first and second displays driven at different refresh rates, according to an embodiment.
Figure 6:
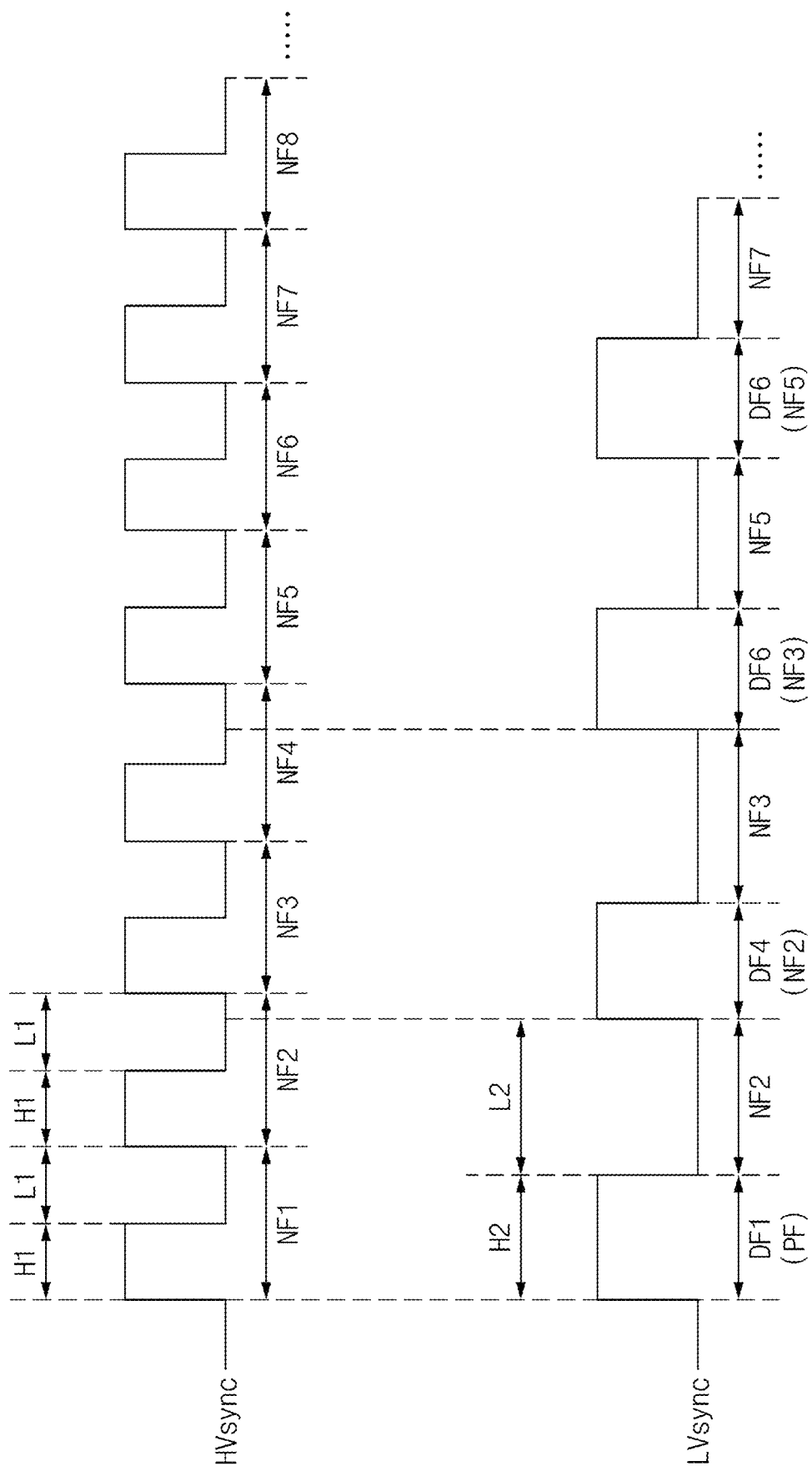
FIG. 6 is a diagram illustrating vertical synchronization signals of first and second displays driven at different refresh rates, according to an embodiment.

FIGS. 5 and 6 are waveform diagrams illustrating a first vertical synchronization signal HVsync of a high frequency and a second vertical synchronization signal LVsync of a low frequency of a first display according to an embodiment.

Referring to FIG. 5, each of the first and second vertical synchronization signals HVsync and LVsync may be a signal indicating a start of one frame. The first display may display an image in synchronization with the high frequency first vertical synchronization signal HVsync, and the second display may display an image in synchronization with the second vertical synchronization signal LVsync of the low frequency. For example, the first vertical synchronization signal HVsync may be a vertical synchronization signal of 120 Hz, and the second vertical synchronization signal LVsync may be a vertical synchronization signal of 60 Hz.

The refresh rate of the first display may be 'N' (where 'N' is a positive integer greater than 1) times the refresh rate of the second display. The period of the first vertical synchronization signal HVsync may be 'N' times the period of the second vertical synchronization signal LVsync. A high logic section H2 (or a third section) of the second vertical synchronization signal LVsync is 'N' times longer than a high logic section H1 (or the first section) of the first vertical synchronization signal HVsync, and a low section L2 (or a fourth section) of the second vertical synchronization signal LVsync may be 'N' times longer than a low section L1 (or the second section) of the first vertical synchronization signal HVsync.

Due to the difference in the refresh rates of the first and second displays, when the image of the corresponding frame is displayed on the first display during the high logic section H2 of the second vertical synchronization signal HVsync, an image of the previous frame may be displayed on the second display instead of the image of the corresponding frame on the first display during the high logic section H2 of the second vertical synchronization signal LVsync. Accordingly, when the image of the corresponding frame is displayed on the first display, the image of the previous frame may be dropped based on the first display and the image of the corresponding frame may be displayed on the second display.

In this regard, in a high logic section H2 of the second vertical synchronization signal LVsync, the image frame input to the data processing unit is transmitted to the first display as the normal frame NF, and may be transmitted to the second display as the drop frame DF.

In a low logic section L2 of the second vertical synchronization signal LVsync overlapping the low logic section L1 of the first vertical synchronization signal HVsync, the image frames input to the data processing unit may be transmitted as the normal frame NF to be transmitted to the first and second displays.

According to an embodiment, the refresh rate of the first display may be 'N' (where, 'N' is a natural number greater than 1) times higher than the refresh rate of the second display. In this case, the image frames input to the data processing unit may be transmitted to the first display as the normal frames NF. In addition, N-th, 2N-th, 3N-th, 4N-th, etc. image frames overlapping the low logic sections L1 and L2 of the first and second vertical synchronization signals HVsync and LVsync among the image frames input to the data processing unit may be transmitted to the second display as the normal frames NF, the image frames overlapping the high logic sections H2 of the second vertical synchronization signals LVsync are not transmitted to the second display as the drop frame DF. Accordingly, T (where, T is a natural number greater than 1) normal frames may be displayed on the first display for 1 second, and 1/N normal frames may be displayed on the second display for 1 second.

For example, as illustrated in FIG. 5, the refresh rate of the first display may be twice as high as that of the second display. In this case, the image frames input to the data processing unit may be transmitted to the first display as normal frames NF1, NF2, NF3, NF4, etc. In addition, even-numbered image frames overlapping the low logic sections of the first and second vertical synchronization signals HVsync and LVsync among the image frames input to the data processing unit may be transmitted to the second display as normal frames NF2, NF4, NF6, NF8, etc. Odd-numbered image frames overlapping the high logic section of the second vertical synchronization signal LVsync among the image frames input to the data processing unit may not be transmitted to the second display as drop frames DF1, DF3, DF5, DF7, etc.

Accordingly, 'i' (where, 'i' is a natural number greater than 1) normal frames may be displayed on the first display for 1 second, and ½ normal frames may be displayed on the second display for 1 second. That is, an image may be displayed on the first display at a refresh rate twice that of the second display, and an image may be displayed on the second display at a refresh rate twice lower than that of the first display.

According to an embodiment, the refresh rate of the first display may be higher than the refresh rate of the second display by a positive integer multiple excluding natural numbers greater than 1. In this case, the image frames input to the data processing unit may be transmitted to the first display as normal frames NF.

At least one of the image frames overlapping the low logic sections of the first and second vertical synchronization signals HVsync and LVsync among the image frames input to the data processing unit may be transmitted to the second display as the normal frame NF.

A plurality of low logic sections L1 of the first vertical synchronization signal HVsync may overlap the low logic section L2 of the second vertical synchronization signal LVsync. In this case, one of the plurality of low logic sections of the first vertical synchronization signal HVsync overlapping the low logic section L2 of the second vertical synchronization signal LVsync may be selected. In addition, the normal frame NF displayed on the first display during the low logic section L1 of the selected first vertical synchronization signal may be displayed as the normal frame NF on the second display.

For example, the low logic section L1 of the first vertical synchronization signal HVsync having a long section overlapping the low logic section L2 of the second vertical synchronization signal LVsync may be selected. Alternatively, the low logic section L1 of the first vertical synchronization signal with a small difference between a falling time of the low logic section L2 of the second vertical synchronization signal LVsync and a falling time of the low logic section L1 of the first vertical synchronization signal may be selected.

The normal frame NF of the first display overlapping the high logic section H2 of the second vertical synchronization signal LVsync may be rendered as the drop frame DF of the second display.

For example, as illustrated in FIG. 6, when the refresh rate of the first display is not 'N' (where 'N' is a positive integer greater than 1) times the refresh rate of the second display, the refresh rate of the first display may be x·y (where, x and y are natural numbers) times higher than the refresh rate of the second display. In this case, the image frames input to the data processing unit may be transmitted to the first display as normal frames NF1, NF2, NF3, NF4, etc. In addition, at least one of the image frames overlapping the low logic sections L1 and L2 of the first and second vertical synchronization signals HVsync and LVsync among the image frames input to the data processing unit is transmitted to the second display as normal frames NF2, NF3, NF5, etc., and the image frames overlapping the high logic section H2 of the second vertical synchronization signal LVsync may not be transmitted to the second display as drop frames DF1, DF4, DF6, etc.

Figure 7:
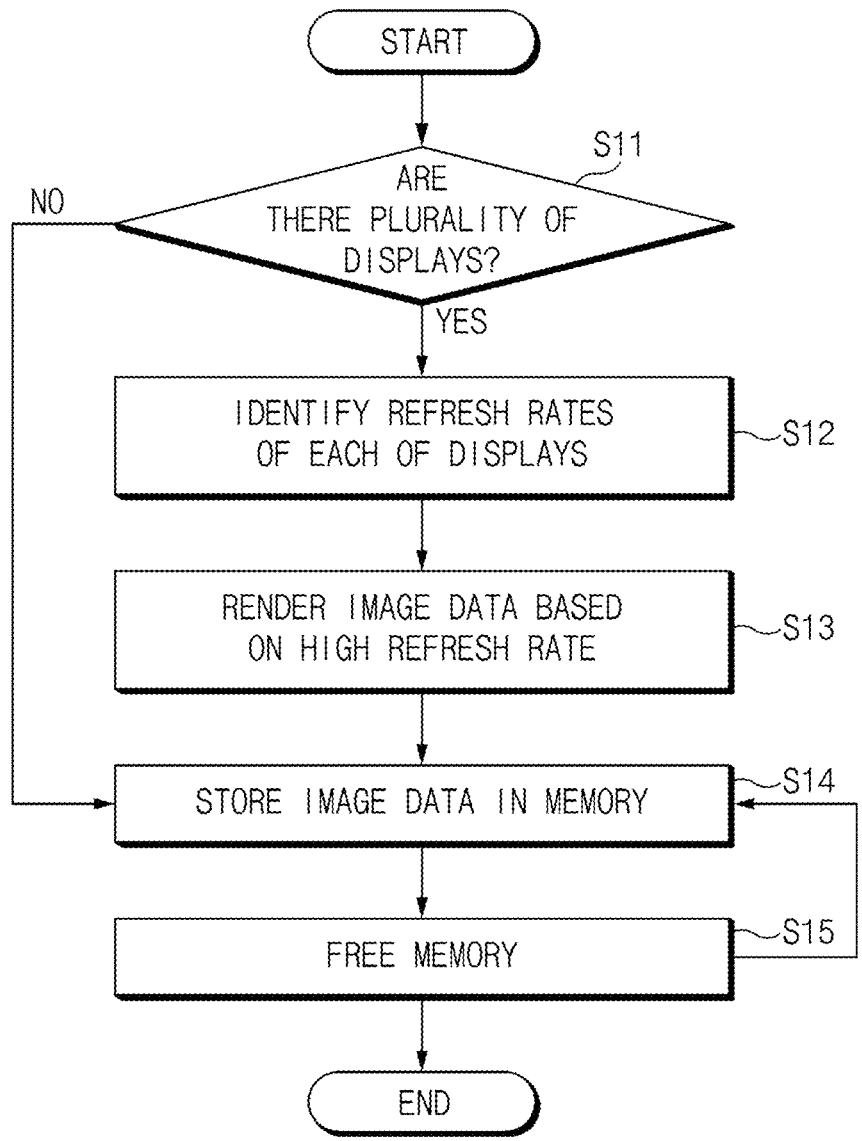
FIG. 7 is a flowchart illustrating an image output operation of a display system according to an embodiment.

FIG. 7 is a flowchart describing an image output method of a display system according to an embodiment. An image output method of a display system according to an embodiment will be described in conjunction with an electronic device illustrated in FIG. 3.

In operation S11, the data processing unit 370 may determine whether there are the plurality of displays 310 and 320 connected to the source device 390. When there are the plurality of displays 310 and 320 connected to the source device 390, operation S12 may be performed. When there is only one display 310 or 320 connected to the source device 390, operation S14 may be performed.

In operation S12, when the plurality of displays 310 and 320 included in the sink device 330 are connected to the source device 390, the data processing unit 370 may identify the refresh rates of each display 310 or 320 to transfer the identified refresh rates to the first control unit 340. The first control unit 340 may identify the transferred refresh rates of each display 310 or 320, and identify whether the refresh rates of each display 310 or 320 are identical to each other and sizes thereof.

In operation S13, when the refresh rates of the displays 310 and 320 are different, the graphics processing unit 360 may render image data to be transmitted to the displays 310 and 320 based on the display having the high refresh rate. For example, when the refresh rate of the first display 310 is higher than that of the second display 320, the graphics processing unit 360 may render the image data based on the refresh rate of the first display 310. Alternatively, when the refresh rate of the second display 320 is higher than that of the first display 310, the graphics processing unit 360 may render image data based on the refresh rate of the second display 320.

In operation S14, when there is a single display or a plurality of displays connected to the source device 390, the image data rendered by the graphics processing unit 360 may be stored in the memory 380.

In operation S15, the image data stored in the memory 380 are transmitted to the first and second displays 310 and 320, so that the memory 380 may be freed to store the subsequent image data.

Meanwhile, the image data rendered in operation S13 may be transmitted as image data of a normal frame to the first display 310 having the high refresh rate through the data processing unit 370. In addition, the data processing unit 370 may drop at least one normal frame among the normal frames transmitted to the first display 310 having the high refresh rate and may transmit the remaining normal frames to the second display 320. Accordingly, images may be displayed on the first and second displays 310 and 320 in synchronization with the refresh rates of the respective displays 310 and 320.

Figure 8:
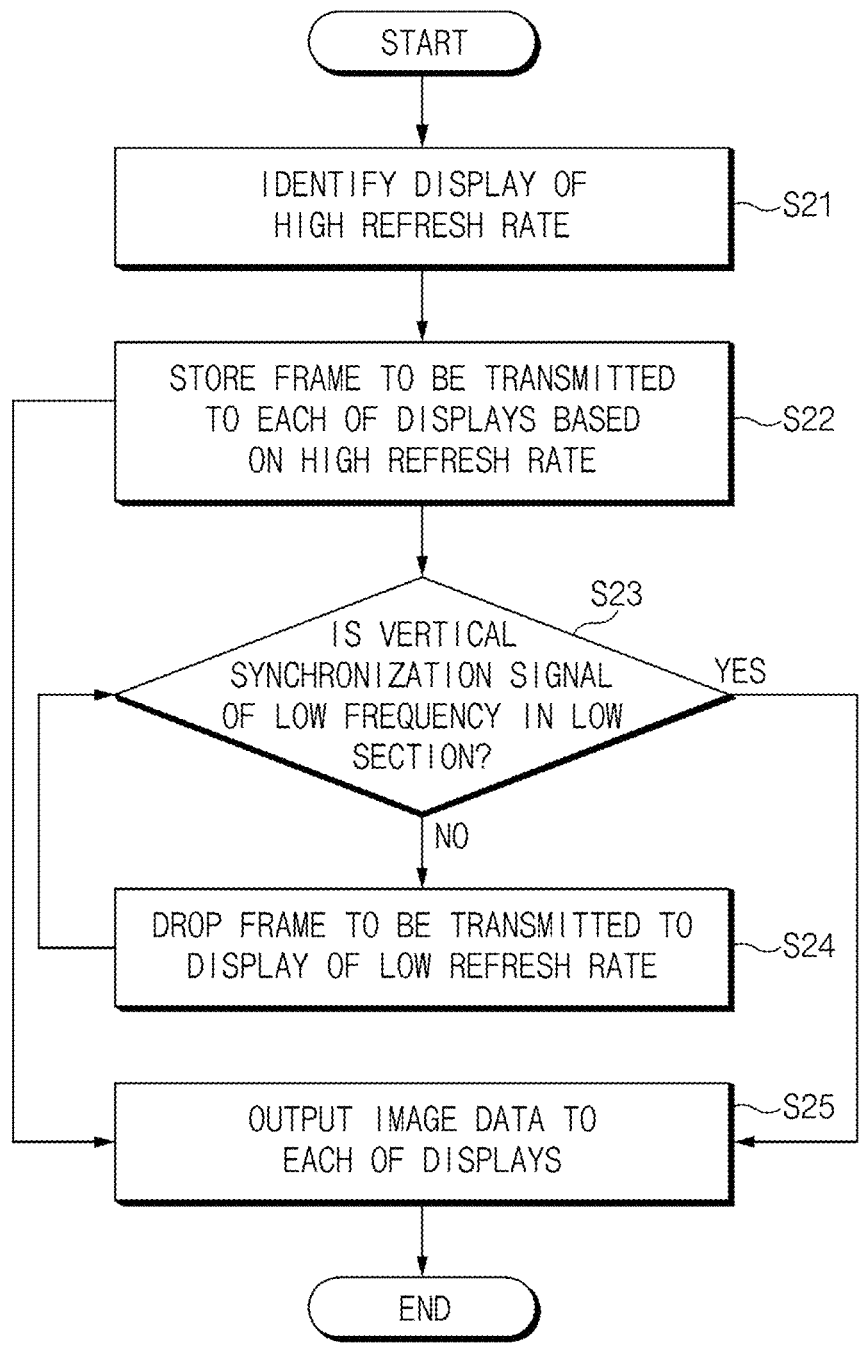
FIG. 8 is a flowchart describing an operation of controlling an arrangement of a drop frame and a normal frame in an image output operation of a display system according to an embodiment.

FIG. 8 is a flowchart describing an operation of controlling an arrangement of drop frames and normal frames in an image output operation of a display system according to an embodiment. An operation of controlling an arrangement of drop frames and normal frames according to an embodiment will be described in conjunction with an electronic device illustrated in FIG. 3.

In operation S21, the data processing unit 370 may identify the identification information of each display 310 or 320 and transfer it to the first control unit 340. The first control unit 340 may identify the frame frequency (or refresh rate) of each display through the transferred identification information of each display 310 or 320.

In operation S22, the graphics processing unit 360 may render image data to be transmitted to each display based on the display having the high refresh rate and store the rendered image data in the memory 380. The image data stored in the memory 380 may be synthesized in units of frames by the first control unit 340 and may be transmitted to the data processing unit 370.

In operation S23, the first control unit 340 may identify a vertical synchronization signal of a display having a low frequency relative to frequencies for a plurality of displays. That is, the first control unit 340 may determine whether the vertical synchronization signal having the low frequency is in a low logic section. When the vertical synchronization signal having the low frequency corresponds to the low logic section, operation S25 may be performed. When the vertical synchronization signal having the low frequency corresponds to a high logic section, operation S24 may be performed.

In operation S24, when the vertical synchronization signal having the low frequency corresponds to the high logic section, the data processing unit 370 may process the image frame as a drop frame. Accordingly, image data may not be transmitted to the display driven by the vertical synchronization signal having the low frequency.

In operation S25, when the vertical synchronization signal having the low frequency corresponds to the low logic section, the data processing unit 370 may process the image frame as a normal frame. Accordingly, image data may be transmitted to the display driven by the vertical synchronization signal having the low frequency. Meanwhile, a display driven by the vertical synchronization signal having the high frequency may display an image regardless of the vertical synchronization signal having the low frequency. A display driven by the vertical synchronization signal having the high frequency may display an image in synchronization with the vertical synchronization signal having the high frequency.

Figure 9:
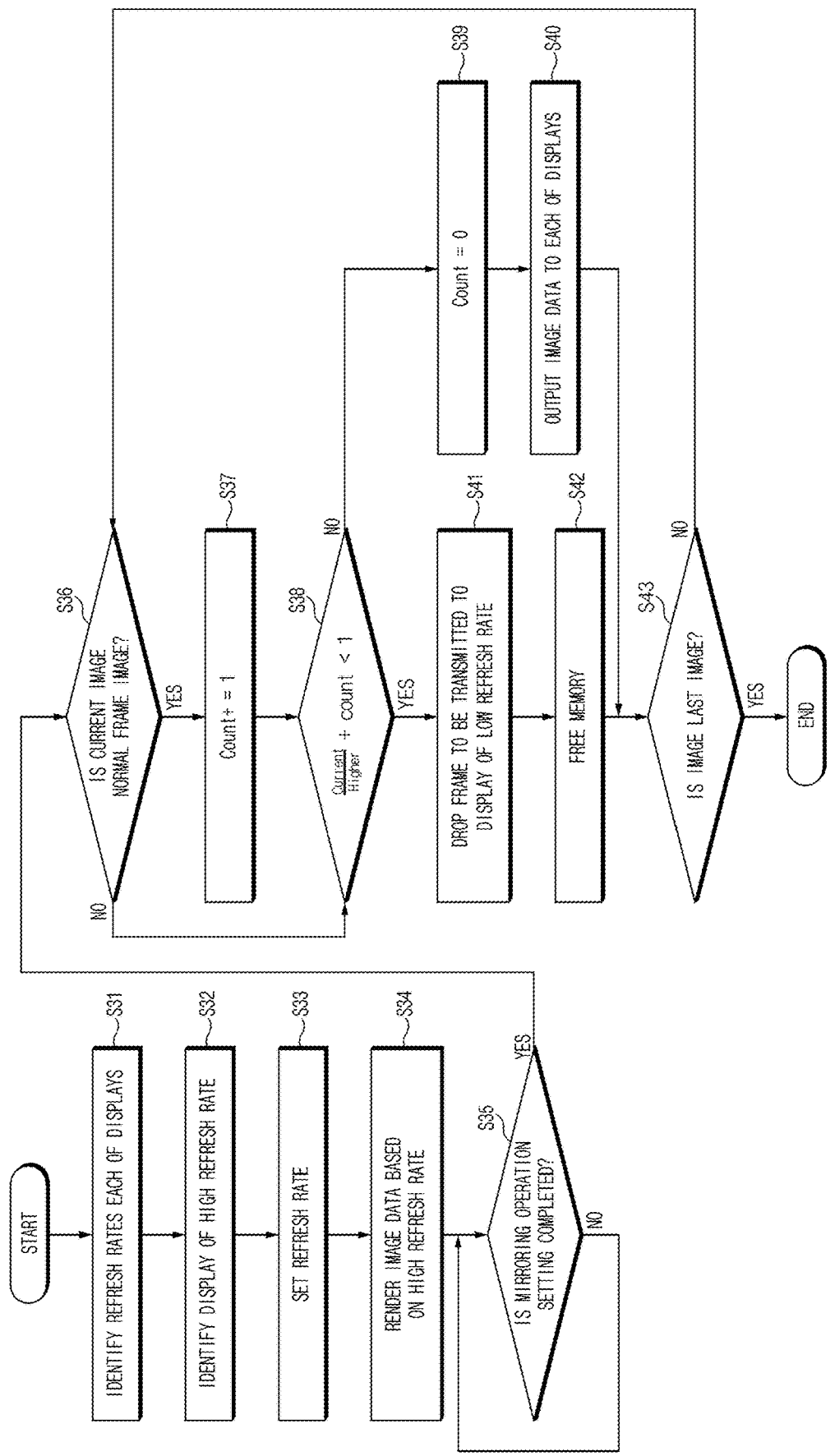
FIG. 9 is a flowchart describing an operation of determining a screen output in an image output operation of a display system according to an embodiment.

FIG. 9 is a flowchart describing an operation of determining a screen output between displays having different refresh rates, according to an embodiment. An operation of determining a screen output according to an embodiment will be described in conjunction with the display system illustrated in FIG. 3.

In operation S31, the data processing unit 370 may identify identification information of each display 310 or 320 and may transfer it to the first control unit 340. The first control unit 340 may identify the frame frequency (or refresh rate) of each display through the transferred identification information of each display 310 or 320.

In operation S32, the first control unit 340 may identify the identification information of the display having the highest refresh rate among the plurality of displays by comparing the respective refresh rates for the plurality of displays.

In operation S33, the first control unit 340 may set the refresh rate to suit each screen of the plurality of displays. In this case, a clock counter of each of the plurality of displays may be set to zero.

In operation S34, the graphics processing unit 360 may render image data to be transmitted to each display based on a display having a high refresh rate.

In operation S35, image data rendered by the graphics processing unit 360 may be stored in the memory 380. The image data stored in the memory 380 may be synthesized in units of frames by the first control unit 340 and may be transmitted to the data processing unit 370.

When the image data is stored in the memory 380, it may be determined whether a mirroring operation setting is completed. When the mirroring operation setting is completed, operation S36 may be performed. When the mirroring operation setting is not completed, the process may be returned to operation S35.

In operation S36, the first control unit 340 may determine the positions of the normal frame and the drop frame and the number (ratio) of the drop frames depending on a ratio of the refresh rates of the plurality of displays. Accordingly, when the first control unit 340 determines that an image of the current frame is the image corresponding to the normal frame, operation S37 may be performed. When the first control unit 340 determines that an image of the current frame is not the image corresponding to the normal frame, operation S38 may be performed.

In operation S37, when the image of the current frame is the image corresponding to the normal frame, the first control unit 340 may set the clock counter to '1'.

In operation S38, the first control unit 340 may calculate a sum of the clock count and a ratio (Higher/Current) of a refresh rate between a display (Higher) driven at the highest refresh rate among a plurality of displays connected to the source device and a display (Current) from which the image of the current frame is to be received. When the sum exceeds '1', the process may proceed to operation S39, and when the sum is less than '1', the process may proceed to operation S41.

In operation S39, when the sum of the ratio of the refresh rate (Higher/Current) and the clock count exceeds '1', the first control unit 340 may reset the clock count to '0'. Accordingly, the first control unit 340 may determine that image data of the current frame should be transmitted to the first and second displays 310 and 320. The first control unit 340 may control the data processing unit 370 such that image data of the current frame may be transmitted to the first and second displays 310 and 320.

In operation S40, the data processing unit 370 may transmit the image data of the current frame to the first and second displays 310 and 320 as image data of the normal frame.

In operation S41, when the sum of the ratio (Higher/Current) of the refresh rate and the clock count is less than '1', the first control unit 340 may determine that the image of the current frame should be selectively transmitted to the first display 310. Accordingly, the data processing unit 370 may transmit the image data of the current frame to the first display 310 as the image data of the normal frame, but may not transmit the image data to the second display 320.

In operation S42, the image data stored in the memory 380 are transmitted to the first and second displays 310 and 320, so that the memory 380 may be freed to store the subsequent image data.

In operation S43, the first control unit 340 may determine whether the image data of the current frame is the last image data. When the image data of the current frame is not the last image data, the process may return to operation S36. When the image data of the current frame is the last image data, the mirroring operation may be terminated.

The plurality of displays included in the sink device according to the embodiment of this specification is not limited to the display devices included in each of the plurality of electronic devices. According to various embodiments, the plurality of displays may be a plurality of display devices included in one electronic device, or may be a display area in which one screen of the display device is divided into a plurality of pieces. For example, a sink device including a plurality of displays may be a single terminal having a multi-screen or a tethered augmented reality (AR)/virtual reality (VR) display device. The same content may be mirrored and output to the plurality of displays, or content different from the other displays may be output to at least one display.

According to various embodiments of the disclosure, a display system includes a sink device including a plurality of displays, the plurality of displays including a display having a high refresh rate compared to at least one other display having a low refresh rate among the plurality of displays and a source device operably coupled to the plurality of displays, and the source device renders the image data based on the display having the high refresh rate among the plurality of displays, and transmits at least a portion of the rendered image data to the plurality of displays in synchronization with respective refresh rates of the at least one other display. Additional various embodiments identified through the specification are possible.

According to various embodiments, the source device may transmit image data of a plurality of normal frames to the display having the high refresh rate, and may perform a drop setting such that image data of a normal frame among the plurality of normal frames is not transmitted to the at least one other display having the low refresh rate.

According to various embodiments, during the normal frame not transmitted to the at least one other display having the low refresh rate, an image of the normal frame may be updated on the display having the high refresh rate, and an image of a previous normal frame may be displayed on the at least one other display having the low refresh rate when the normal frame is dropped.

According to various embodiments, the source device may include a control unit that identifies the refresh rates of the plurality of displays and controls a drop ratio of the plurality of normal frames based on a ratio of the refresh rates of the plurality of displays.

According to various embodiments, the drop ratio may increase as a ratio of the high refresh rate and the low refresh rate of the plurality of displays increases.

According to various embodiments, the source device may further include a data processing unit that operates under a control of the control unit, and the data processing unit may output the image data to the display having the high refresh rate and the at least one other display having the low refresh rate during a first normal frame, and may not output the image data to the at least one other display having the low refresh rate when the drop setting is performed.

According to various embodiments, a first image may be displayed in synchronization with a first vertical synchronization signal having different first and second sections on the display having the high refresh rate, and a second image may be displayed in synchronization with a second vertical synchronization signal having a third section longer than the first section and a fourth section longer than the second section on the at least one other display having the low refresh rate, and the data processing unit may arrange the normal frame in the first and second sections to transmit the image data of the normal frame to the display having the high refresh rate, may perform the drop setting of a normal frame in the third section, and may arrange a normal frame in the fourth section to transmit the image data of the normal frame to the display having the low refresh rate.

According to various embodiments, the image data of the normal frame displayed on the display having the high refresh rate in the second section may be the same as the image data of the normal frame displayed on the at least one other display having the low refresh rate in the fourth section overlapping the second section.

According to various embodiments, the source device may further include a graphics processing unit that renders image data to be transmitted to the plurality of displays, based on the display having the high refresh rate among the plurality of displays.

According to various embodiments, the source device may further include a memory that stores the image data rendered by the graphics processing unit, and the memory may be freed to a storable state after the image data is output to the display having the high refresh rate and the low refresh rate through the data processing unit, and may be freed to the storable state after the image data is output to the display having the high refresh rate without outputting the image data to the at least one other display having the low refresh rate through the data processing unit.

According to various embodiments of the disclosure, a method of outputting an image of a display system includes identifying a refresh rate of each of a plurality of displays, the plurality of displays including a display having a high refresh rate compared to at least one other display among the plurality of displays having a low refresh rate, rendering image data to be transmitted to the plurality of displays based on the display having the high refresh rate among the plurality of displays, and transmitting at least a portion of the rendered image data to the plurality of displays in synchronization with respective refresh rates of the at least one other display having a low refresh rate.

According to various embodiments, the transmitting of the image data to the plurality of displays may include transmitting image data of a plurality of normal frames to the display having the high refresh rate and performing a drop setting such that image data of a normal frame among the plurality of normal frames is not transmitted to the at least one other display having the low refresh rate.

According to various embodiments, the method of outputting the image of a display system may further include identifying the refresh rates of the plurality of displays, and controlling a drop ratio of the plurality of normal frames based on a ratio of the refresh rates of the plurality of displays.

According to various embodiments, the drop ratio may increase as a ratio of the high refresh rate and the low refresh rate of the plurality of displays increases.

According to various embodiments, the method of outputting the image of the display system may further include freeing a memory to a storable state after the image data is transmitted to the display having the high refresh rate and the at least one other display having the low refresh rate, and freeing the memory to the storable state after the image data is transmitted to the display having the high refresh rate without transmitting the image data to the at least one other display having the low refresh rate.

According to various embodiments of the disclosure, a display system include at least one first display having a high refresh rate, at least one second display having a low refresh rate, and a source device operably coupled to the first and second displays, and the source device renders the image data based on a refresh rate of the first display, transmits the rendered image data to the first display as image data of a plurality of normal frames, and performs drop setting such that image data of a normal frame among the plurality of normal frames is not transmitted to the second display.

According to various embodiments, during the normal frame not transmitted to the second display, an image of a corresponding normal frame may update on the plurality of displays, and an image of a previous normal frame may be displayed on the at least one other display having the low refresh rate when the normal frame is dropped.

According to various embodiments, the source device may include a control unit that identifies refresh rates of the plurality of displays and controls a drop ratio of the plurality of normal frames based on a ratio of the refresh rates of the plurality of displays.

According to various embodiments, the drop ratio may increase as a ratio of the high refresh rate and the low refresh rate increases.

According to various embodiments, the source device may further include a memory that stores the rendered image data, and the memory may be freed to a storable state after the image data of the normal frame are output to the first display and the second display, and may be freed to the storable state after the image data of the normal frame are output to the first display without outputting the image data of the normal frame to the second display.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar elements. The singular expression may include the plural expression unless the context clearly indicates otherwise. As used herein, each of such phrases as "A or B", "at least one of A and/or B", "A, B, or C", and "at least one of A, B, and/or C" may include any one of, or all possible combinations of the items enumerated together in a corresponding one of the phrases. As used herein, such terms as "1st" and "2nd" or "first" and "second" may be used to modify a corresponding component regardless of order or importance, to simply distinguish a corresponding component from another, and does not limit the components. When a (e.g., first) component is referred to as being "connected (functionally or communicatively)" or "coupled" to another (e.g., second) component, the component may be directly connected to the other component or may be connected through another component (e.g., a third component).

In this specification, a term "adapted to or configured to" may be used interchangeably with, depending on the context, for example, "suitable for~", "having the ability to~", "modified to~", "made to~", "capable of~", or "designed to~" in hardware or software. In some circumstances, the expression "a device configured to~" may mean that the device is "capable of~" with other devices or components. For example, the phrase "a processor set to (or configured to) A, B, and C" may refer to a dedicated processor (e.g., embedded processor) for performing the corresponding operations or a general-purpose processor (e.g., a CPU or an AP) capable of performing the corresponding operations by executing one or more programs stored in a memory device (e.g., a memory).

As used in this specification, the term "module" may include a unit implemented in hardware, software, or firmware, and may interchangeably be used with other terms, for example, "logic", "logic block", "component", or "circuitry". A "module" may be a single integral component, or a minimum unit or part thereof, adapted to perform one or more functions. A "module" may be implemented mechanically or electronically, and may include, for example, known or to-be developed application-specific integrated circuit (ASIC) chips, field-programmable gate arrays (FPGAs), or programmable logic devices, which performs certain operations.

At least a portion of an apparatus (e.g., modules or functions thereof) or a method (e.g., operations) according to various embodiments may be implemented by instructions stored in a computer-readable storage medium in the form of a program module. When the instruction is executed by the processor, the processor may perform a function corresponding to the instruction. Computer-readable recording media may include hard disks, floppy disks, magnetic media (e.g., magnetic tape), optical recording media (e.g., CD-ROM, DVD, magnetic-optical media (e.g., a floptical disc), internal memory, etc. Instructions may include code generated by a compiler or code that may be executed by an interpreter.

According to various embodiments, each component (e.g., a module or a program) may be composed of a singular or a plurality of entities, may be a component in which some sub-components are omitted from among the aforementioned sub-components, or may further include other sub-components. Alternatively, or additionally, some components (e.g., a module or a program module) may be integrated into a single component to perform the same or similar functions performed by each corresponding component before the integration. According to various embodiments, operations performed by the module, the program, or another component may be carried out sequentially, in parallel, repeatedly, or heuristically, or at least some of the operations may be executed in a different order or omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A display system comprising:
   a sink device including a plurality of displays, the plurality of displays including a display having a high refresh rate compared to at least one other display having a low refresh rate among the plurality of displays; and
   a source device operably coupled to the plurality of displays included in the sink device,
   the source device configured to:
      render image data to be transmitted to each display among the plurality of displays, by adjusting a number of normal frames transmitted to the at least one other display having the low refresh rate based on the display having the high refresh rate among the plurality of displays, and
      in synchronization with respective refresh rates of the at least one other display, transmit at least a portion of the rendered image data to the at least one other display having the low refresh rate,
      wherein the number of the normal frames transmitted to the at least one other display having the low refresh rate is less than a number of the normal frames transmitted to the display having the high refresh rate.

2. The display system of claim 1, wherein the source device is further configured to:
   transmit image data of a plurality of normal frames to the display having the high refresh rate, and
   perform a drop setting such that image data of a normal frame among the plurality of normal frames is not transmitted to the at least one other display having the low refresh rate.

3. The display system of claim 2, wherein, during the normal frame not transmitted to the at least one other display having the low refresh rate, an image of the normal frame is updated on the display having the high refresh rate and an image of a previous normal frame is displayed on the at least one other display having the low refresh rate when the normal frame is dropped.

4. The display system of claim 2, wherein the source device includes a control unit configured to:
identify the refresh rates of the plurality of displays, and
control a drop ratio of the plurality of normal frames based on a ratio of the refresh rates of the plurality of displays.

5. The display system of claim 4, wherein the drop ratio increases as a ratio of the high refresh rate and the low refresh rate of the plurality of displays increases.

6. The display system of claim 5, wherein:
the source device further includes a data processing unit configured to operate under a control of the control unit, and
the data processing unit is configured to:
output the image data to the display having the high refresh rate and the at least one other display having the low refresh rate during a first normal frame, and
not output the image data to the at least one other display having the low refresh rate when the drop setting is performed.

7. The display system of claim 5, wherein:
a first image is displayed in synchronization with a first vertical synchronization signal having different first and second sections on the display having the high refresh rate,
a second image is displayed in synchronization with a second vertical synchronization signal having a third section longer than the first section and a fourth section longer than the second section on the at least one other display having the low refresh rate, and
the source device further includes a data processing unit configured to:
arrange the normal frame in the first and second sections to transmit the image data of the normal frame to the display having the high refresh rate,
perform the drop setting of a normal frame in the third section, and
arrange a normal frame in the fourth section to transmit the image data of the normal frame to the at least one other display having the low refresh rate.

8. The display system of claim 7, wherein the image data of the normal frame displayed on the display having the high refresh rate in the second section are the same as the image data of the normal frame displayed on the at least one other display having the low refresh rate in the fourth section overlapping the second section.

9. The display system of claim 6, wherein the source device further includes a graphics processing unit configured to render image data to be transmitted to the plurality of displays based on the display having the high refresh rate among the plurality of displays.

10. The display system of claim 9, wherein:
the source device further includes a memory configured to store the image data rendered by the graphics processing unit, and
the memory is freed to a storable state after the image data is output to the display having the high refresh rate and the at least one other display having the low refresh rate through the data processing unit, and is freed to the storable state after the image data is output to the display having the high refresh rate without outputting the image data to the at least one other display having the low refresh rate through the data processing unit.

11. A method of outputting an image of a display system, the method comprising:
identifying a refresh rate of each of a plurality of displays, the plurality of displays including a display having a high refresh rate compared to at least one other display among the plurality of displays having a low refresh rate;
rendering image data to be transmitted to each display among the plurality of displays, by adjusting a number of normal frames transmitted to the at least one other display having the low refresh rate based on the display having the high refresh rate among the plurality of displays; and
in synchronization with respective refresh rates of the at least one other display having a low refresh rate, transmitting at least a portion of the rendered image data to the at least one other display having the low refresh rate,
wherein the number of the normal frames transmitted to the at least one other display having the low refresh rate is less than the number of a normal frames transmitted to the display having the high refresh rate.

12. The method of claim 11, wherein the transmitting of the image data to the plurality of displays includes:
transmitting image data of a plurality of normal frames to the display having the high refresh rate, and
performing a drop setting such that image data of a normal frame among the plurality of normal frames is not transmitted to the at least one other display having the low refresh rate.

13. The method of claim 12, further comprising:
identifying the refresh rates of the plurality of displays, and
controlling a drop ratio of the plurality of normal frames based on a ratio of the refresh rates of the plurality of displays.

14. The method of claim 13, wherein the drop ratio increases as a ratio of the high refresh rate and the low refresh rate of the plurality of displays increases.

15. The method of claim 11, further comprising:
freeing a memory to a storable state after the image data is transmitted to the display having the high refresh rate and the at least one other display having a low refresh rate; and
freeing the memory to the storable state after the image data is transmitted to the display having the high refresh rate without transmitting the image data to the at least one other display having the low refresh rate.

16. A display system comprising:
at least one first display having a high refresh rate;
at least one second display having a low refresh rate; and
a source device operably coupled to the first and second displays,
the source device configured to:
render image data to be transmitted to each display among the at least one first display and to each display among the at least one second display, by adjusting a number of normal frames transmitted to the at least one second display based on the high refresh rate of the first display,
transmit the rendered image data to the first display as image data of a plurality of normal frames, and
perform drop setting such that image data of a normal frame among the plurality of normal frames is not transmitted to the second display, wherein a number of the normal frames transmitted to the at least one second display having the low refresh rate is less than a number of the normal frames transmitted to the at least one first display.

17. The display system of claim 16, wherein, during the normal frame not transmitted to the second display, an image of a corresponding normal frame is updated on the first display, and an image of a previous normal frame is displayed on the second display having the low refresh rate when the normal frame is dropped.

18. The display system of claim 16, wherein the source device includes a control unit configured to:
   identify refresh rates of a plurality of displays including the at least one first display and the at least one second display, and
   control a drop ratio of the plurality of normal frames based on a ratio of the refresh rates of the plurality of displays.

19. The display system of claim 18, wherein the drop ratio increases as a ratio of the high refresh rate and the low refresh rate increases.

20. The display system of claim 16, wherein:
   the source device further includes a memory configured to store the rendered image data, and
   the memory is freed to a storable state after the image data of the normal frame are output to the first display and the second display, and is freed to the storable state after the image data of the normal frame are output to the first display without outputting the image data of the normal frame to the second display.

* * * * *